United States Patent
Deng et al.

(10) Patent No.: US 12,385,809 B2
(45) Date of Patent: Aug. 12, 2025

(54) EQUIPMENT FOR SIMULATING HIGH-SPEED MAGNETIC LEVITATION OPERATION

(71) Applicant: Southwest Jiaotong University, Chengdu (CN)

(72) Inventors: Zigang Deng, Chengdu (CN); Weihua Zhang, Chengdu (CN); Long Kou, Chengdu (CN); Jun Zheng, Chengdu (CN); Yanxing Cheng, Chengdu (CN); Qiwen Ma, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 865 days.

(21) Appl. No.: 17/533,011

(22) Filed: Nov. 22, 2021

(65) Prior Publication Data

US 2023/0160782 A1    May 25, 2023

(51) Int. Cl.
    *G01M 17/08* (2006.01)
    *B61B 13/08* (2006.01)
    *B61L 27/60* (2022.01)

(52) U.S. Cl.
    CPC ............. *G01M 17/08* (2013.01); *B61B 13/08* (2013.01); *B61L 27/60* (2022.01)

(58) Field of Classification Search
    CPC ......... G01M 17/08; B61L 27/60; B61B 13/08
    See application file for complete search history.

(56) References Cited

U.S. PATENT DOCUMENTS

| 11,366,038 B1 * | 6/2022 | Deng | G01H 1/12 |
| 2019/0259295 A1 * | 8/2019 | Bortolon | G09B 9/02 |
| 2021/0348984 A1 * | 11/2021 | Jiang | F16D 63/008 |
| 2022/0115965 A1 * | 4/2022 | Zheng | H02N 15/00 |
| 2024/0035930 A1 * | 2/2024 | Zhang | B61B 13/08 |
| 2024/0175785 A1 * | 5/2024 | Deng | G01M 17/10 |

FOREIGN PATENT DOCUMENTS

| CN | 1963421 A | 5/2007 |
| CN | 107064835 A | 8/2017 |
| CN | 108982130 A | 12/2018 |
| CN | 110542568 A | 12/2019 |
| JP | 2010190691 A | 9/2010 |
| KR | 100786601 B1 | 12/2007 |

* cited by examiner

*Primary Examiner* — Eric S. McCall

(57) ABSTRACT

An equipment for simulating high-speed magnetic levitation operation includes a wheel, a driving mechanism, a first test guideway, a second test guideway, a first test object and a second test object. The wheel includes a rim and a hub arranged at a middle of the rim. The driving mechanism is configured to drive the wheel to rotate. The first test guideway and the second test guideway are arranged on an inner wall of the rim, and are respectively arranged on two sides of the hub. The first test object is arranged in the first test guideway, and the second test object is arranged in the second test guideway.

7 Claims, 3 Drawing Sheets

EQUIPMENT FOR SIMULATING HIGH-SPEED MAGNETIC LEVITATION OPERATION

TECHNICAL FIELD

This application relates to magnetic levitation (maglev) technology, and more specifically to an equipment for simulating high-speed maglev operation.

BACKGROUND

The current researches on levitation force, guidance force and dynamic behavior of a magnetic levitation system are mainly carried out on static or quasi-static test equipment. Although some apparatuses can support dynamic operation research for maglev, the operating speed is not high. And they can only support the experimental research of a single-mode magnetic levitation. At present, the development of ultra-high-speed magnetic levitation trains is mainly limited by some problems, such as the selection of levitation mode, the lack of simulation experimental data under ultra-high-speed operation, etc.

SUMMARY

An object of the present disclosure is to provide equipment for simulating high-speed magnetic levitation (maglev) operation to help solve the problems in the prior art.

The technical solutions of the present disclosure are described as follows.

Provided herein is an equipment for simulating high-speed maglev operation, comprising:
a wheel;
a driving mechanism;
a first test guideway; a second test guideway;
a first test object; and
a second test object;
wherein the wheel comprises a rim and a hub; the hub is arranged at a middle of the rim; the driving mechanism is configured to drive the wheel to rotate vertically; the first test guideway and the second test guideway are arranged on an inner wall of the rim; the first test guideway is arranged on one side of the hub, and the second test guideway is arranged on the other side of the hub; the first test object is arranged in the first test guideway; and the second test object is arranged in the second test guideway.

In an embodiment, the equipment further comprises a first position control device and a second position control device; the first position control device is configured to control a reciprocating movement of the first test object along a radial direction of the first test guideway; and the second position control device is configured to control a reciprocating movement of the second test object along a radial direction of the second test guideway.

In an embodiment, the first position control device comprises a first bottom plate, a first sliding plate and a first motor; two first linear sliding tables parallel to each other are arranged on the first bottom plate; a first screw rod is arranged between the two first linear sliding tables; the first screw rod is connected to an output end of the first motor; a top of each of the two first linear sliding tables is provided with a first linear chute; a bottom of the first sliding plate is provided with two first sliding blocks respectively matched with two first linear chutes; the bottom of the first sliding plate between the two first sliding blocks is provided with a first thread insert; the first thread insert is threadedly connected with the first screw rod; a top of the first sliding plate is provided with a first clamping arm; the first test object is arranged on the first clamping arm; and an extension line of an orthographic projection of the first screw rod on the hub passes through a center of the hub; and
the second position control device comprises a third bottom plate, a third sliding plate and a third motor; two third linear sliding tables parallel to each other are arranged on the third bottom plate; a third screw rod is arranged between the two third linear sliding tables; the third screw rod is connected to an output end of the third motor; a top of each of the two third linear sliding tables is provided with a third linear chute; a bottom of the third sliding plate is provided with two third sliding blocks respectively matched with two third linear chutes; the bottom of the third sliding plate between the two third sliding blocks is provided with a third thread insert; the third thread insert is threadedly connected with the third screw rod; a top of the third sliding plate is provided with a second clamping arm; the second test object is arranged on the second clamping arm; and an extension line of an orthographic projection of the third screw rod on the hub passes through a center of the hub.

In an embodiment, the equipment further comprises a first position control device and a second position control device; the first position control device is configured to control a reciprocating movement of the first test object along an axial direction of the first test guideway; and the second position control device is configured to control a reciprocating movement of the second test object along an axial direction of the second test guideway.

In an embodiment, the first position control device comprises a second bottom plate, a second sliding plate and a second motor; two second linear sliding tables parallel to each other are arranged on the second bottom plate; a second screw rod is arranged between the two second linear sliding tables; the second screw rod is connected to an output end of the second motor; a top of each of the two second linear sliding tables is provided with a second linear chute; a bottom of the second sliding plate is provided with two second sliding blocks respectively matched with two second linear chutes; the bottom of the second sliding plate between the two second sliding blocks is provided with a second thread insert; the second thread insert is threadedly connected with the second screw rod; a top of the second sliding plate is provided with a first clamping arm; the first test object is arranged on the first clamping arm; and the second screw rod and a central axis of the hub are parallel to each other; and
the second position control device comprises a fourth bottom plate, a fourth sliding plate and a fourth motor; two fourth linear sliding tables parallel to each other are arranged on the fourth bottom plate; a fourth screw rod is arranged between the two fourth linear sliding tables; the fourth screw rod is connected to an output end of the fourth motor; a top of each of the two fourth linear sliding tables is provided with a fourth linear chute; a bottom of the fourth sliding plate is provided with two fourth sliding blocks respectively matched with the two fourth linear chutes; the bottom of the fourth sliding plate between the two fourth sliding blocks is provided with a fourth thread insert; the fourth thread insert is threadedly connected with the fourth screw rod; a top of the fourth sliding plate is provided with a second clamping arm; the second test object is arranged on the second clamping arm; and the fourth screw rod and the central axis of the hub are parallel to each other.

In an embodiment, the equipment further comprises an eddy-current brake device; the eddy-current brake device comprises an eddy-current brake sliding table and an eddy-current brake displacement control mechanism; an end of the eddy-current brake sliding table is provided with an eddy-current brake magnet; the eddy-current brake displacement control mechanism is configured to drive the eddy-current brake sliding table to reciprocate; and the hub is arranged on a movement path of the eddy-current brake sliding table.

The eddy-current brake displacement control mechanism comprises a fifth bottom plate, a fifth sliding plate and a fifth motor; two fifth linear sliding tables parallel to each other are arranged on the fifth bottom plate; a fifth screw rod is arranged between the two fifth linear sliding tables; the fifth screw rod is connected to an output end of the fifth motor; a top of each of the two fifth linear sliding tables is provided with a fifth linear chute; a bottom of the fifth sliding plate is provided with two fifth sliding blocks respectively matched with two fifth linear chutes; the bottom of the fifth sliding plate between the two fifth sliding blocks is provided with a fifth thread insert; the fifth thread insert is threadedly connected with the fifth screw rod; a top of the fifth sliding plate is provided with the eddy-current brake sliding table.

In an embodiment, the driving mechanism comprises a variable frequency alternating-current (AC) motor; an emergency brake is arranged between the variable frequency AC motor and the wheel; the emergency brake comprises a brake disc; an output shaft of the variable frequency AC motor is connected to an input end of a rotating shaft of the brake disc through a first coupling; an output end of the rotating shaft of the brake disc is connected to a main shaft of the wheel through a second coupling; the input end of the rotating shaft of the brake disc is rotatably arranged on a base through a first bearing seat; and the main shaft of the wheel is rotatably arranged on a frame through a second bearing seat.

In an embodiment, a protective cover is arranged above the wheel; and a bottom of the protective cover is fixedly arranged on a frame.

In an embodiment, a vibration exciter is arranged above the first test object; a first six-axis force sensor is arranged between the vibration exciter and the first test object; the second test object is fixedly arranged on a clamping arm; and a second six-axis force sensor is arranged between the second test object and the clamping arm.

In an embodiment, the first test guideway is a circular Halbach permanent magnet guideway; the second test guideway is a circular metal guideway; the first test object is a high-temperature superconducting magnetic levitation test object; and the second test object is an electrodynamic levitation permanent magnet test object.

Compared to the prior art, the present disclosure has the following beneficial effects.

In the present disclosure, the wheel is configured to vertically rotate, and by virtue of a structure of the hub and rim, the test can be performed on an inner side of the wheel, such that the rotation speed of the guideway can be increased, and the linear speed of the guideway can reach 600 km/h or more. With the help of the first test guideway and the second test guideway, the first test object and the second test object can be tested simultaneously, allowing for an improved test efficiency. Moreover, the first test guideway, the first test object, the second test guideway and the second test object can be designed flexibly to carry out various maglev dynamic operation experiments.

Other features and advantages of the present disclosure will be described below, and part of them will become obvious from the description, or understood by implementing the embodiments of the present disclosure. The object and other advantages of the present disclosure can be realized and obtained by the description, claims, and the structures specifically pointed out in the drawings.

BRIEF DESCRIPTION OF THE DRAWINGS

In order to explain the technical solutions of the embodiments of the present disclosure more clearly, the drawings needed to be used in the embodiments will be briefly described below. It should be understood that presented in the drawings are only some embodiments of the present disclosure, which are not intend to limit the scope of the disclosure. It should be noted that other related drawings can be obtained by those of ordinary skill in the art from these drawings without paying creative effort.

Figure 1:
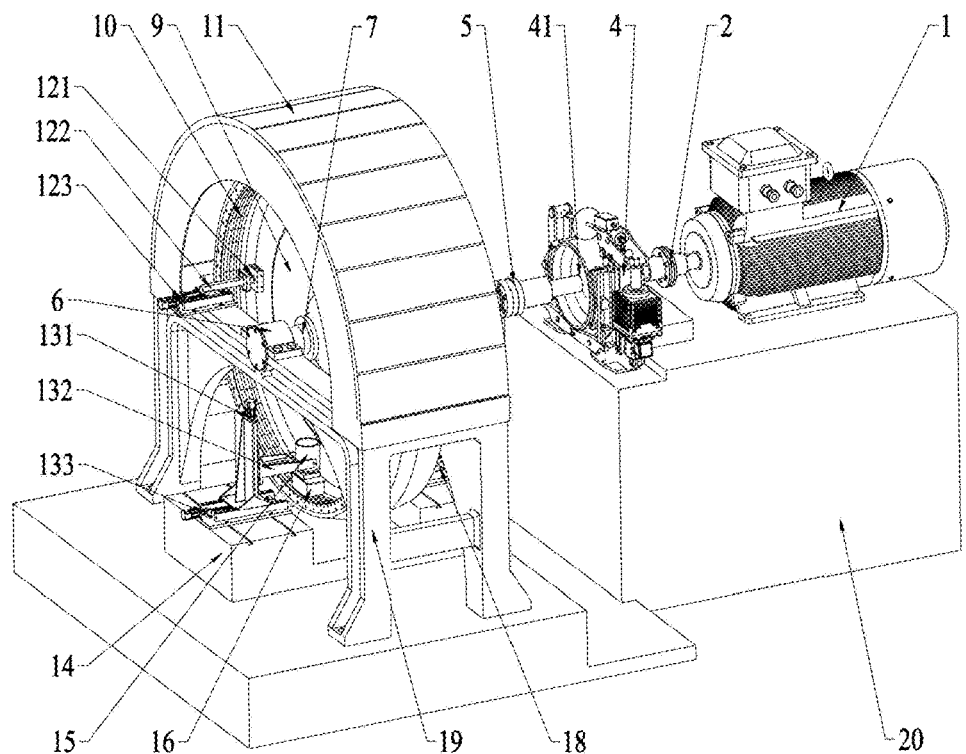
FIG. 1 is a schematic diagram of a structure of an equipment for simulating high-speed magnetic levitation operation according to an embodiment of the present disclosure.
Figure 2:
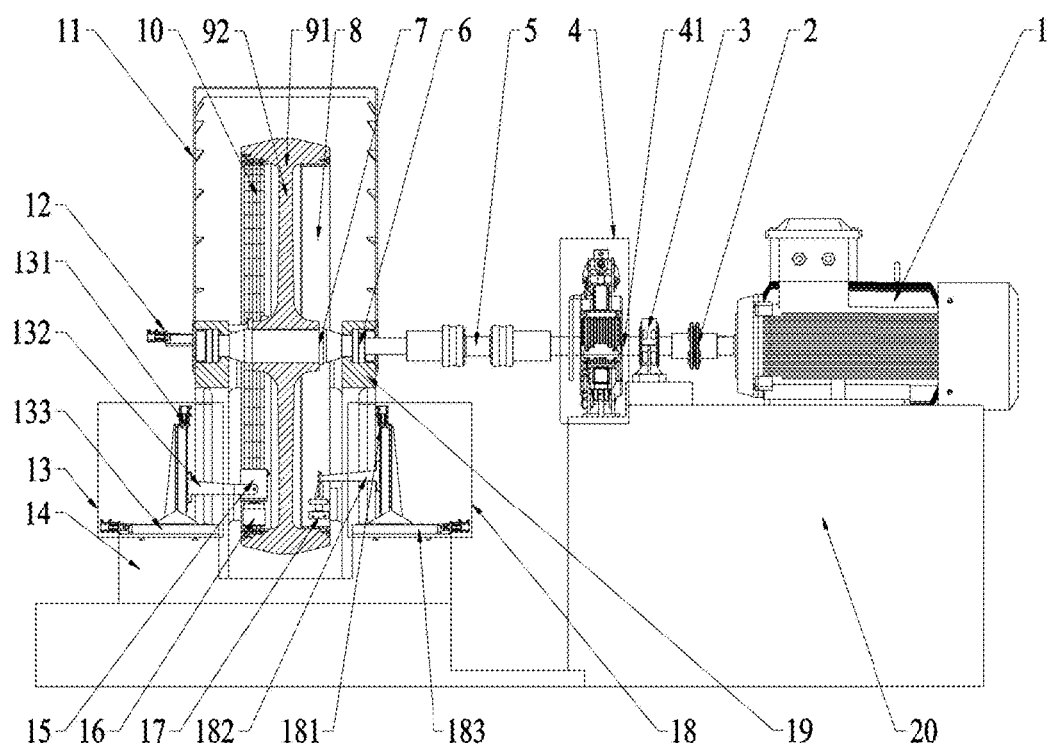
FIG. 2 is a cross-sectional view of the equipment according to an embodiment of the present disclosure.

In the drawings: 1, variable frequency AC motor; 2, first coupling; 3, first bearing seat; 4, emergency brake; 41, brake disc; 5, second coupling; 6, second bearing seat; 7, main shaft; 8, second test guideway; 9, wheel; 91, rim; 92, hub; 10, first test guideway; 11, protective cover; 12, eddy-current brake device; 121, eddy-current brake magnet; 122, eddy-current brake sliding table; 123, eddy-current brake displacement control mechanism; 1231, fifth motor; 1232, fifth linear sliding table; 1233, fifth screw rod; 1234, fifth sliding plate; 1235, fifth linear chute; 1236, fifth sliding block; 1237, fifth bottom plate; 13, first position control device; 131, first longitudinal displacement driving mechanism; 1311, first motor; 1312, first linear sliding table; 1313, first screw rod; 1314, first sliding plate; 1315, first linear chute; 1316, first sliding block; 1317, first bottom plate; 132, first clamping arm; 133, first lateral displacement driving mechanism; 1331, second motor; 1332, second linear sliding table; 1333, second screw rod; 1334, second sliding plate; 1335, second linear chute; 1336, second sliding block; 1337, second bottom plate; 14, position control device base; 15, vibration exciter; 16, first test object; 17, second test object; 18, second position control device; 181, second longitudinal displacement driving mechanism; 1811, third motor; 1812, third linear sliding table; 1813, third screw rod; 1814, third sliding plate; 1815, third linear chute; 1816, third sliding block; 1817, third bottom plate; 182, second clamping arm; 183, second lateral displacement driving mechanism; 1831, fourth motor; 1832, fourth linear sliding table; 1833, fourth screw rod; 1834, fourth sliding plate; 1835, fourth linear chute; 1836, fourth sliding block; 1837, fourth bottom plate; 19, frame; 20, base; 21, first six-axis force sensor; 22, second six-axis force sensor.

DETAILED DESCRIPTION OF EMBODIMENTS

The disclosure will be described completely and clearly below with reference to the accompanying drawings and embodiments to make the object, technical solutions, and beneficial effects of the present disclosure clearer. Obviously, provided below are merely some embodiments of the disclosure. The components illustrated in the drawings herein can be arranged and designed in various configurations. Therefore, the embodiments provided in the accompanying drawings are merely illustrative, and are not intended to limit the scope of the present disclosure. Based on the embodiments of the present disclosure, all other embodiments obtained by those skilled in the art without paying any creative effort shall fall within the scope of the present disclosure.

It should be noted that similar reference numerals or letters indicate similar elements in the following drawings. Therefore, once a certain element has been defined in a figure, it does not need to be further defined and explained in subsequent figures. At the same time, as used herein, the terms "first", "second", etc. are only used to distinguish the elements referred to, and should not be understood as indicating or implying relative importance.

Embodiment 1

As shown in FIGS. 1-5, provided herein is an equipment for simulating high-speed magnetic levitation (maglev) operation, which includes a wheel 9, a driving mechanism, a first test guideway 10, a second test guideway 8, a first test object 16 and a second test object 17. The wheel 9 includes a rim 91 and a hub 92. The hub 92 is arranged at a middle of the rim 91. The driving mechanism is configured to drive the wheel 9 to rotate. The first test guideway 10 and the second test guideway 8 are arranged on an inner wall of the rim 91; the first test guideway 10 is arranged on one side of the hub 92, and the second test guideway 8 is arranged on the other side of the hub 92. The first test object 16 is arranged in the first test guideway 10; and the second test object 17 is arranged in the second test guideway 8.

In an embodiment, the equipment further includes a first position control device 13 and a second position control device 18. The first position control device 13 is configured to control a reciprocating movement of the first test object 16 along a radial direction of the first test guideway 10; and the second position control device 18 is configured to control a reciprocating movement of the second test object 17 along a radial direction of the second test guideway 8.

In an embodiment, the first position control device 13 includes a first bottom plate 1317, a first sliding plate 1314 and a first motor 1311. Two first linear sliding tables 1312 parallel to each other are arranged on the first bottom plate 1317. A first screw rod 1313 is arranged between the two first linear sliding tables 1312; the first screw rod 1313 is connected to an output end of the first motor 1311. A right side of each of the two first linear sliding tables 1312 is provided with a first linear chute 1315. A left side of the first sliding plate 1314 is provided with two first sliding blocks 1316 respectively matched with two first linear chutes 1315. The left side of the first sliding plate 1314 between the two first sliding blocks 1316 is provided with a first thread insert. The first thread insert is threadedly connected with the first screw rod 1313. A right side of the first sliding plate 1314 is provided with a first clamping arm 132. The first test object 16 is arranged on the first clamping arm 132. An extension line of an orthographic projection of the first screw rod 1313 on the hub 92 passes through a center of the hub 92.

The second position control device 18 includes a third bottom plate 1817, a third sliding plate 1814 and a third motor 1811. Two third linear sliding tables 1812 parallel to each other are arranged on the third bottom plate 1817. A third screw rod 1813 is arranged between the two third linear sliding tables 1812. The third screw rod 1813 is connected to an output end of the third motor 1811. A left side of each of the two third linear sliding tables 1812 is provided with a third linear chute 1815. A right side of the third sliding plate 1814 is provided with two third sliding blocks 1816 respectively matched with two third linear chutes 1815. The right side of the third sliding plate 1814 between the two third sliding blocks 1816 is provided with a third thread insert. The third thread insert is threadedly connected with the third screw rod 1813. A left side of the third sliding plate 1814 is provided with a second clamping arm 182. The second test object 17 is arranged on the second clamping arm 182. An extension line of an orthographic projection of the third screw rod 1813 on the hub 92 passes through a center of the hub 92.

In an embodiment, the equipment further includes an eddy-current brake device 12. The eddy-current brake device 12 includes an eddy-current brake sliding table 122 and an eddy-current brake displacement control mechanism 123. An end of the eddy-current brake sliding table 122 is provided with an eddy-current brake magnet 121. The eddy-current brake displacement control mechanism 123 is configured to drive the eddy-current brake sliding table 122 to reciprocate. The hub 92 is arranged on a movement path of the eddy-current brake sliding table 122.

The eddy-current brake displacement control mechanism 123 includes a fifth bottom plate 1237, a fifth sliding plate 1234 and a fifth motor 1231. Two fifth linear sliding tables 1232 parallel to each other are arranged on the fifth bottom plate 1237. A fifth screw rod 1233 is arranged between the two fifth linear sliding tables 1232, and the fifth screw rod 1233 is connected to an output end of the fifth motor 1231. A top of each of the two fifth linear sliding tables 1232 is provided with a fifth linear chute 1235. A bottom of the fifth sliding plate 1234 is provided with two fifth sliding blocks 1236 respectively matched with two fifth linear chutes 1235. The bottom of the fifth sliding plate 1234 between the two fifth sliding blocks 1236 is provided with a fifth thread insert. The fifth thread insert is threadedly connected with the fifth screw rod 1233. A top of the fifth sliding plate 1234 is provided with the eddy-current brake sliding table 122.

In an embodiment, the driving mechanism includes a variable frequency alternating-current (AC) motor 1. An emergency brake 4 is arranged between the variable frequency AC motor 1 and the wheel 9. The emergency brake 4 includes a brake disc 41. An output shaft of the variable frequency AC motor 1 is connected to an input end of a rotating shaft of the brake disc 41 through a first coupling 2. An output end of the rotating shaft of the brake disc 41 is connected to a main shaft 7 of the wheel 9 through a second coupling 5. The input end of the rotating shaft of the brake disc 41 is rotatably arranged on a base 20 through a first bearing seat 3. The main shaft 7 of the wheel 9 is rotatably arranged on a frame 19 through a second bearing seat 6.

In an embodiment, a protective cover 11 is arranged above the wheel 9. A bottom of the protective cover 11 is fixedly arranged on the frame 19.

In an embodiment, a vibration exciter 15 is arranged above the first test object 16. A first six-axis force sensor 21 is arranged between the vibration exciter 15 and the first test object 16. The second test object 17 is fixedly arranged on the second clamping arm 182. A second six-axis force sensor 22 is arranged between the second test object 17 and the second clamping arm 182.

In an embodiment, the first test guideway 10 is a circular Halbach permanent magnet guideway. The second test guideway 8 is a circular metal guideway. The first test object 16 is a high-temperature superconducting magnetic levitation test object; and the second test object 17 is an electrodynamic levitation permanent magnet test object.

Embodiment 2

As shown in FIGS. 1-5, provided herein is an equipment for simulating high-speed magnetic levitation operation, which includes a wheel 9, a driving mechanism, a first test guideway 10, a second test guideway 8, a first test object 16 and a second test object 17. The wheel 9 includes a rim 91 and a hub 92. The hub 92 is arranged at a middle of the rim 91. The driving mechanism is configured to drive the wheel 9 to rotate. The first test guideway 10 and the second test guideway 8 are arranged on an inner wall of the rim 91; the first test guideway 10 is arranged on one side of the hub 92, and the second test guideway 8 is arranged on the other side of the hub 92. The first test object 16 is arranged in the first test guideway 10; and the second test object 17 is arranged in the second test guideway 8.

In an embodiment, the equipment further includes a first position control device 13 and a second position control device 18. The first position control device 13 is configured to control a reciprocating movement of the first test object 16 along an axial direction of the first test guideway 10; and the second position control device 18 is configured to control a reciprocating movement of the second test object 17 along an axial direction of the second test guideway 8.

In an embodiment, the first position control device 13 includes a second bottom plate 1337, a second sliding plate 1334 and a second motor 1331. Two second linear sliding tables 1332 parallel to each other are arranged on the second bottom plate 1337. A second screw rod 1333 is arranged between the two second linear sliding tables 1332; the second screw rod 1333 is connected to an output end of the second motor 1331. A top of each of the two second linear sliding tables 1332 is provided with a second linear chute 1335. A bottom of the second sliding plate 1334 is provided with two second sliding blocks 1336 respectively matched with two second linear chutes 1335. The bottom of the second sliding plate 1334 between the two second sliding blocks 1336 is provided with a second thread insert. The second thread insert is threadedly connected with the second screw rod 1333. A top of the second sliding plate 1334 is provided with a first clamping arm 132. The first test object 16 is arranged on the first clamping arm 132. The second screw rod 1333 and a central axis of the hub 92 are parallel to each other.

The second position control device 18 includes a fourth bottom plate 1837, a fourth sliding plate 1834 and a fourth motor 1831. Two fourth linear sliding tables 1832 parallel to each other are arranged on the fourth bottom plate 1837. A fourth screw rod 1833 is arranged between the two fourth linear sliding tables 1832; the fourth screw rod 1833 is connected to an output end of the fourth motor 1831. A top of each of the two fourth linear sliding tables 1832 is provided with a fourth linear chute 1835. A bottom of the fourth sliding plate 1834 is provided with two fourth sliding blocks 1836 respectively matched with two fourth linear chutes 1835. The bottom of the fourth sliding plate 1834 between the two fourth sliding blocks 1836 is provided with a fourth thread insert. The fourth thread insert is threadedly connected with the fourth screw rod 1833. A top of the fourth sliding plate 1834 is provided with a second clamping arm 182. The second test object 17 is arranged on the second clamping arm 182. The fourth screw rod 1833 and a central axis of the hub 92 are parallel to each other.

In an embodiment, the equipment further includes an eddy-current brake device 12. The eddy-current brake device 12 includes an eddy-current brake sliding table 122 and an eddy-current brake displacement control mechanism 123. An end of the eddy-current brake sliding table 122 is provided with an eddy-current brake magnet 121. The eddy-current brake displacement control mechanism 123 is configured to drive the eddy-current brake sliding table 122 to reciprocate. The hub 92 is arranged on a movement path of the eddy-current brake sliding table 122.

The eddy-current brake displacement control mechanism 123 includes a fifth bottom plate 1237, a fifth sliding plate 1234 and a fifth motor 1231. Two fifth linear sliding tables 1232 parallel to each other are arranged on the fifth bottom plate 1237. A fifth screw rod 1233 is arranged between the two fifth linear sliding tables 1232; the fifth screw rod 1233 is connected to an output end of the fifth motor 1231. A top of each of the two fifth linear sliding tables 1232 is provided with a fifth linear chute 1235. A bottom of the fifth sliding plate 1234 is provided with two fifth sliding blocks 1236 respectively matched with two fifth linear chutes 1235. The bottom of the fifth sliding plate 1234 between the two fifth sliding blocks 1236 is provided with a fifth thread insert. The fifth thread insert is threadedly connected with the fifth screw rod 1233. A top of the fifth sliding plate 1234 is provided with the eddy-current brake sliding table 122.

In an embodiment, the driving mechanism includes a variable frequency AC motor 1. An emergency brake 4 is arranged between the variable frequency AC motor 1 and the wheel 9. The emergency brake 4 includes a brake disc 41. An output shaft of the variable frequency AC motor 1 is connected to an input end of a rotating shaft of the brake disc 41 through a first coupling 2. An output end of the rotating shaft of the brake disc 41 is connected to a main shaft 7 of the wheel 9 through a second coupling 5. The input end of the rotating shaft of the brake disc 41 is rotatably arranged on a base 20 through a first bearing seat 3. The main shaft 7 of the wheel 9 is rotatably arranged on a frame 19 through a second bearing seat 6.

In an embodiment, a protective cover 11 is arranged above the wheel 9. A bottom of the protective cover 11 is fixedly arranged on the frame 19.

In an embodiment, a vibration exciter 15 is arranged above the first test object 16. A first six-axis force sensor 21 is arranged between the vibration exciter 15 and the first test object 16. The second test object 17 is fixedly arranged on the second clamping arm 182. A second six-axis force sensor 22 is arranged between the second test object 17 and the second clamping arm 182.

In an embodiment, the first test guideway 10 is a circular Halbach permanent magnet guideway. The second test guideway 8 is a circular metal guideway. The first test object 16 is a high-temperature superconducting magnetic levitation test object; and the second test object 17 is an electrodynamic levitation permanent magnetic test object.

Embodiment 3

As shown in FIGS. 1-5, provided herein is an equipment for simulating high-speed magnetic levitation operation, which includes a wheel 9, a driving mechanism, a first test guideway 10, a second test guideway 8, a first test object 16 and a second test object 17. The wheel 9 includes a rim 91 and a hub 92. The hub 92 is arranged at a middle of the rim 91. The driving mechanism is configured to drive the wheel 9 to rotate. The first test guideway 10 and the second test guideway 8 are arranged on an inner wall of the rim 91; the first test guideway 10 is arranged on one side of the hub 92, and the second test guideway 8 is arranged on the other side of the hub 92. The first test object 16 is arranged in the first test guideway 10; and the second test object 17 is arranged in the second test guideway 8.

In an embodiment, the equipment further includes a first position control device 13 and a second position control device 18. The first position control device 13 is configured to control a reciprocating movement of the first test object 16 along a radial direction and an axial direction of the first test guideway 10; and the second position control device 18 is configured to control a reciprocating movement of the second test object 17 along a radial direction and an axial direction of the second test guideway 8.

In an embodiment, the first position control device 13 includes a first bottom plate 1317, a first sliding plate 1314 and a first motor 1311. Two first linear sliding tables 1312 parallel to each other are arranged on the first bottom plate 1317. A first screw rod 1313 is arranged between the two first linear sliding tables 1312; the first screw rod 1313 is connected to an output end of the first motor 1311. A right side of each of the two first linear sliding tables 1312 is provided with a first linear chute 1315. A left side of the first sliding plate 1314 is provided with two first sliding blocks 1316 respectively matched with two first linear chutes 1315. The left side of the first sliding plate 1314 between the two first sliding blocks 1316 is provided with a first thread insert. The first thread insert is threadedly connected with the first screw rod 1313. A right side of the first sliding plate 1314 is provided with a first clamping arm 132. The first test object 16 is arranged on the first clamping arm 132. An extension line of an orthographic projection of the first screw rod 1313 on the hub 92 passes through a center of the hub 92.

Figure 3:
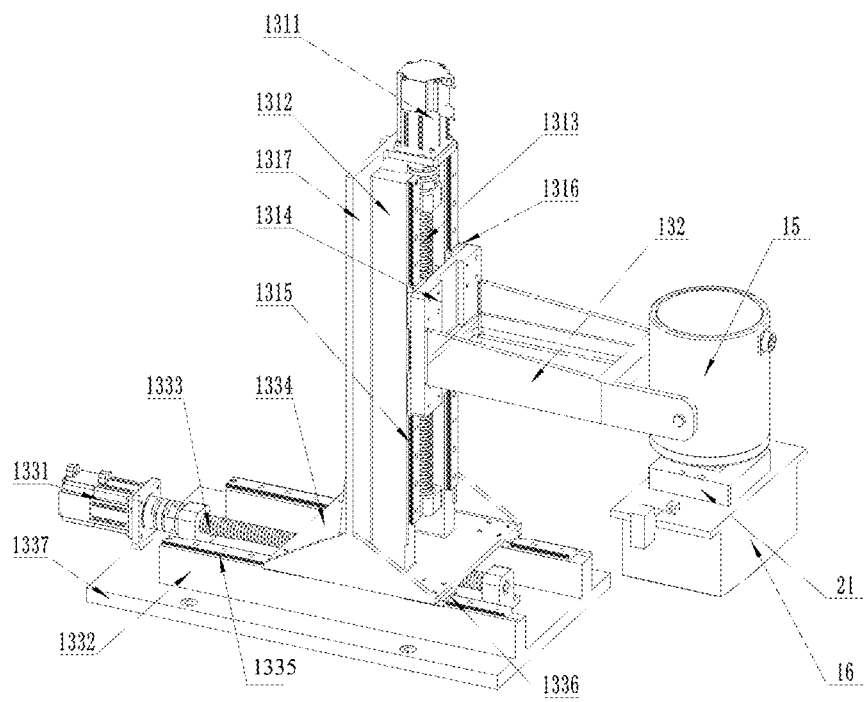
FIG. 3 is a schematic diagram of a structure of a first position control device according to an embodiment of the present disclosure.

The first position control device 13 further includes a second bottom plate 1337, a second sliding plate 1334 and a second motor 1331. Two second linear sliding tables 1332 parallel to each other are arranged on the second bottom plate 1337. A second screw rod 1333 is arranged between the two second linear sliding tables 1332; the second screw rod 1333 is connected to an output end of the second motor 1331. A top of each of the two second linear sliding tables 1332 is provided with a second linear chute 1335. A bottom of the second sliding plate 1334 is provided with two second sliding blocks 1336 respectively matched with two second linear chutes 1335. The bottom of the second sliding plate 1334 between the two second sliding blocks 1336 is provided with a second thread insert. The second thread insert is threadedly connected with the second screw rod 1333. A top of the second sliding plate 1334 is provided with the first clamping arm 132 by the first bottom plate 1317, the two first linear sliding tables 1312, and the first sliding plate 1314, as shown in FIG. 3. The first test object 16 is arranged on the first clamping arm 132. The second screw rod 1333 and a central axis of the hub 92 are parallel to each other.

The second position control device 18 includes a third bottom plate 1817, a third sliding plate 1814 and a third motor 1811. Two third linear sliding tables 1812 parallel to each other are arranged on the third bottom plate 1817. A third screw rod 1813 is arranged between the two third linear sliding tables 1812. The third screw rod 1813 is connected to an output end of the third motor 1811. A left side of each of the two third linear sliding tables 1812 is provided with a third linear chute 1815. A right side of the third sliding plate 1814 is provided with two third sliding blocks 1816 respectively matched with two third linear chutes 1815. The right side of the third sliding plate 1814 between the two third sliding blocks 1816 is provided with a third thread insert. The third thread insert is threadedly connected with the third screw rod 1813. A left side of the third sliding plate 1814 is provided with a second clamping arm 182. The second test object 17 is arranged on the second clamping arm 182. An extension line of an orthographic projection of the third screw rod 1813 on the hub 92 passes through a center of the hub 92.

Figure 4:
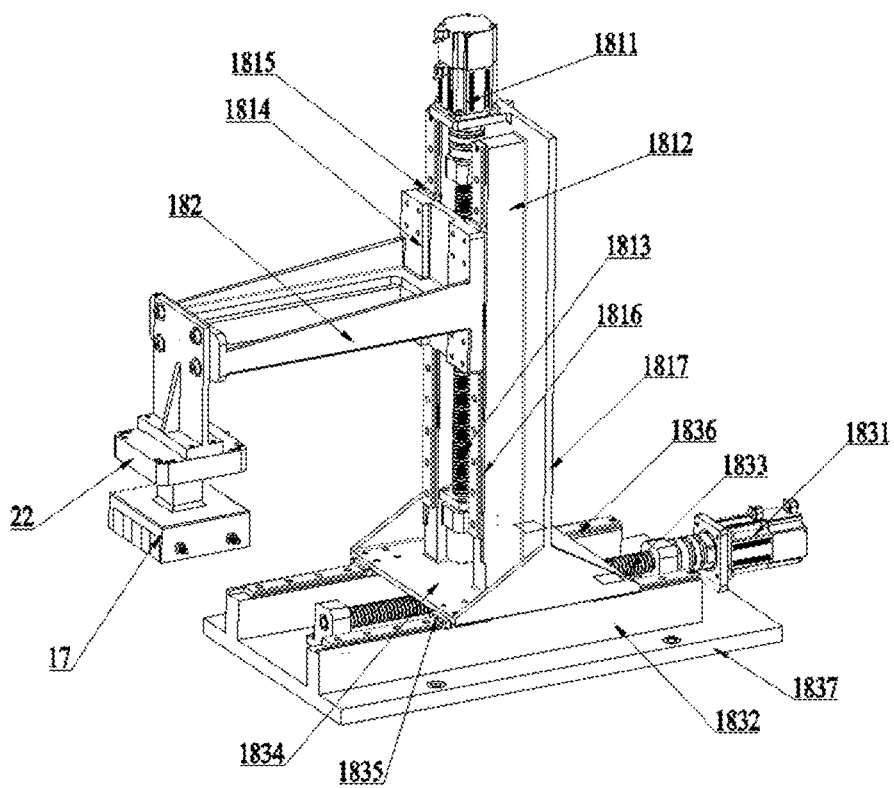
FIG. 4 is a schematic diagram of a structure of a second position control device according to an embodiment of the present disclosure.
Figure 5:
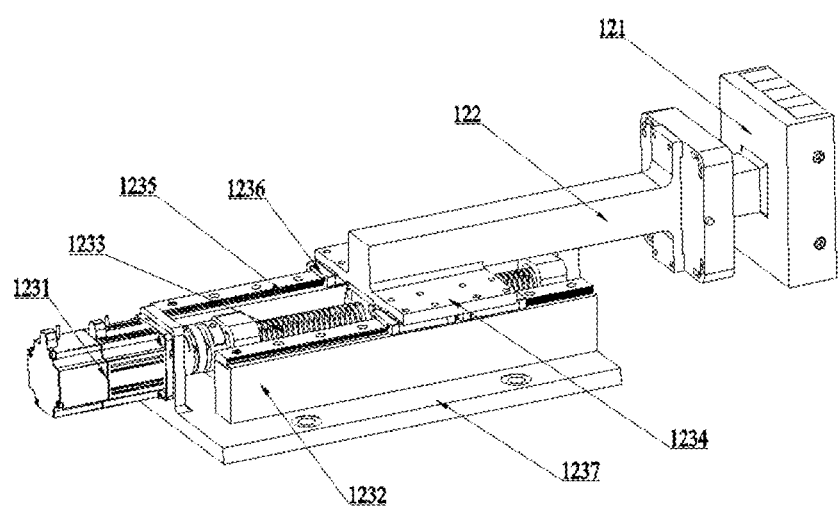
FIG. 5 is a schematic diagram of a structure of an eddy-current brake device according to an embodiment of the present disclosure.

The second position control device 18 further includes a fourth bottom plate 1837, a fourth sliding plate 1834 and a fourth motor 1831. Two fourth linear sliding tables 1832 parallel to each other are arranged on the fourth bottom plate 1837. A fourth screw rod 1833 is arranged between the two fourth linear sliding tables 1832; the fourth screw rod 1833 is connected to an output end of the fourth motor 1831. A top of each of the two fourth linear sliding tables 1832 is provided with a fourth linear chute 1835. A bottom of the fourth sliding plate 1834 is provided with two fourth sliding blocks 1836 respectively matched with two fourth linear chutes 1835. The bottom of the fourth sliding plate 1834 between the two fourth sliding blocks 1836 is provided with a fourth thread insert. The fourth thread insert is threadedly connected with the fourth screw rod 1833. A top of the fourth sliding plate 1834 is provided with the second clamping arm 182 by the third bottom plate 1817, the two third linear sliding tables 1812, and the third sliding plate 1814, as shown in FIG. 4. The second test object 17 is arranged on the second clamping arm 182. The fourth screw rod 1833 and a central axis of the hub 92 are parallel to each other.

In an embodiment, the equipment further includes an eddy-current brake device 12. The eddy-current brake device 12 includes an eddy-current brake sliding table 122 and an eddy-current brake displacement control mechanism 123. An end of the eddy-current brake sliding table 122 is provided with an eddy-current brake magnet 121. The eddy-current brake displacement control mechanism 123 is configured to drive the eddy-current brake sliding table 122 to reciprocate. The hub 92 is arranged on a movement path of the eddy-current brake sliding table 122.

The eddy-current brake displacement control mechanism 123 includes a fifth bottom plate 1237, a fifth sliding plate 1234 and a fifth motor 1231. Two fifth linear sliding tables 1232 parallel to each other are arranged on the fifth bottom plate 1237. A fifth screw rod 1233 is arranged between the two fifth linear sliding tables 1232; the fifth screw rod 1233 is connected to an output end of the fifth motor 1231. A top of each of the two fifth linear sliding tables 1232 is provided with a fifth linear chute 1235. A bottom of the fifth sliding plate 1234 is provided with two fifth sliding blocks 1236 respectively matched with two fifth linear chutes 1235. The bottom of the fifth sliding plate 1234 between the two fifth sliding blocks 1236 is provided with a fifth thread insert. The fifth thread insert is threadedly connected with the fifth screw rod 1233. A top of the fifth sliding plate 1234 is provided with the eddy-current brake sliding table 122.

The first motor 1311, the second motor 1331, the third motor 1811, the fourth motor 1831 and the fifth motor 1231 are all servo motors.

In an embodiment, the driving mechanism includes a variable frequency AC motor 1. An emergency brake 4 is arranged between the variable frequency AC motor 1 and the wheel 9. The emergency brake 4 includes a brake disc 41. An output shaft of the variable frequency AC motor 1 is connected to an input end of a rotating shaft of the brake disc 41 through a first coupling 2. An output end of the rotating shaft of the brake disc 41 is connected to a main shaft 7 of the wheel 9 through a second coupling 5. The input end of the rotating shaft of the brake disc 41 is rotatably arranged on a base 20 through a first bearing seat 3. The main shaft 7 of the wheel 9 is rotatably arranged on a frame 19 through a second bearing seat 6. The second coupling 5 is a ball cage universal coupling.

In an embodiment, a protective cover 11 is arranged above the wheel 9. A bottom of the protective cover 11 is fixedly arranged on the frame 19.

In an embodiment, a vibration exciter 15 is arranged above the first test object 16. A first six-axis force sensor 21 is arranged between the vibration exciter 15 and the first test object 16. The second test object 17 is fixedly arranged on the second clamping arm 182. A second six-axis force sensor 22 is arranged between the second test object 17 and the second clamping arm 182.

In an embodiment, the first test guideway 10 is a circular Halbach permanent magnet guideway. The second test guideway 8 is a circular metal guideway. The first test object 16 is a high-temperature superconducting magnetic levitation test object; and the second test object 17 is an electrodynamic levitation permanent magnet test object. The high-temperature superconducting magnetic levitation test object is also provided with a vibration sensor. The second test guideway 8 is selected from the group consisting of a circular aluminum guideway, a circular copper guideway, and so on. The high-temperature superconducting magnetic levitation test object includes a Dewar. The second test object 17 is a permanent magnet.

The variable frequency AC motor 1 drives the first coupling 2 to rotate, and then drives the brake disc 41 to rotate, then is configured to drive the second coupling 5 to rotate, then to drive the main shaft 7 to rotate, and then to drive the wheel 9 and the circular Halbach permanent magnet guideway and the circular aluminum guideway fixedly installed on left and right sides of the wheel to rotate.

When the high-temperature superconducting magnetic levitation test object is levitated in a desired gap on the circular Halbach permanent magnet guideway rotating with a high speed, the first position control device 13 is configured to drive the high-temperature superconducting magnetic levitation test object to change a displacement relative to the circular Halbach permanent magnet guideway, so that the first six-axis force sensor 21 can be configured to detect a levitation force and a guidance force under dynamic operation. In addition, When the high-temperature superconducting magnetic levitation test object is levitated in the desired gap on the circular Halbach permanent magnet guideway rotating with the high speed, the vibration exciter 15 is configured to perform vibration excitation on the high-temperature superconducting magnetic levitation test object, the first six-axis force sensor 21 and the vibration sensor can be configured to test a response of a levitation system under dynamic operation.

When the electrodynamic levitation permanent magnet test object is levitated in a desired gap on the circular aluminum guideway rotating with a high speed, the second position control device 18 is configured to drive the electrodynamic levitation permanent magnet test object to change a displacement relative to the circular aluminum guideway, so that the second six-axis force sensor 22 can be configured to detect a levitation force, a guidance force and a magnetic resistance under dynamic operation.

Described above are only preferred embodiments of the present disclosure and are not intended to limit the present disclosure. It should be understood that any modifications, replacements and improvements made by those skilled in the art without departing from the spirit and scope of the present disclosure should fall within the scope of the present disclosure defined by the appended claims.

What is claimed is:

1. An equipment for simulating high-speed magnetic levitation (maglev) operation, comprising:
a wheel;
a driving mechanism;
a first test guideway;
a second test guideway;
a first test object;
a second test object;
a first position control device; and
a second position control device;
wherein the wheel comprises a rim and a hub; the hub is arranged at a middle of the rim;
the driving mechanism is configured to drive the wheel to rotate;
the first test guideway and the second test guideway are arranged on an inner wall of the rim; the first test guideway is arranged on one side of the hub, and the second test guideway is arranged on the other side of the hub;
the first test object is arranged in the first test guideway;
the second test object is arranged in the second test guideway;
the first position control device is configured to control a reciprocating movement of the first test object along a radial direction of the first test guideway; and the second position control device is configured to control a reciprocating movement of the second test object along a radial direction of the second test guideway;
a vibration exciter is arranged above the first test object; a first six-axis force sensor is arranged between the vibration exciter and the first test object; the second test object is fixedly arranged on a first clamping arm; and a second six-axis force sensor is arranged between the second test object and the first clamping arm; and
the first test guideway is a circular Halbach permanent magnet guideway; the second test guideway is a circular metal guideway; the first test object is a high-temperature superconducting magnetic levitation test object; and the second test object is an electrodynamic levitation permanent magnet test object.

2. The equipment of claim 1, wherein the first position control device comprises a first bottom plate, a first sliding plate and a first motor; two first linear sliding tables parallel to each other are arranged on the first bottom plate; a first screw rod is arranged between the two first linear sliding tables; the first screw rod is connected to an output end of the first motor; a side of each of the two first linear sliding tables is provided with a first linear chute; a first side of the first sliding plate is provided with two first sliding blocks respectively matched with two first linear chutes; the first side of the first sliding plate between the two first sliding blocks is provided with a first thread insert; the first thread insert is threadedly connected with the first screw rod; a second side of the first sliding plate is provided with a second clamping arm; the first test object is arranged on the second clamping arm; and an extension line of an orthographic projection of the first screw rod on the hub passes through a center of the hub; and the second position control device comprises a second bottom plate, a second sliding plate and a second motor; two second linear sliding tables parallel to each other are arranged on the second bottom plate; a second screw rod is arranged between the two second linear sliding tables; the second screw rod is connected to an output end of the second motor; a side of each of the two second linear sliding tables is provided with a second linear chute; a first side of the second sliding plate is provided with two second sliding blocks respectively matched with two second linear chutes; the first side of the second sliding plate between the two second sliding blocks is provided with a second thread insert; the second thread insert is threadedly connected with the second screw rod; a second side of the second sliding plate is provided with the first clamping arm; the second test object is arranged on the first clamping arm; and an extension line of an orthographic projection of the second screw rod on the hub passes through a center of the hub.

3. The equipment of claim 1, further comprising:
an eddy-current brake device;
wherein the eddy-current brake device comprises an eddy-current brake sliding table and an eddy-current brake displacement control mechanism; an end of the eddy-current brake sliding table is provided with an eddy-current brake magnet; the eddy-current brake displacement control mechanism is configured to drive the eddy-current brake sliding table to reciprocate; and the hub is arranged on a movement path of the eddy-current brake sliding table.

4. The equipment of claim 1, wherein the driving mechanism comprises a variable frequency alternating-current (AC) motor; an emergency brake is arranged between the variable frequency AC motor and the wheel; the emergency brake comprises a brake disc; an output shaft of the variable frequency AC motor is connected to an input end of a rotating shaft of the brake disc through a first coupling; an output end of the rotating shaft of the brake disc is connected to a main shaft of the wheel through a second coupling; the input end of the rotating shaft of the brake disc is rotatably arranged on a base through a first bearing seat; and the main shaft of the wheel is rotatably arranged on a frame through a second bearing seat.

5. The equipment of claim 1, wherein a protective cover is arranged above the wheel; and a bottom of the protective cover is fixedly arranged on a frame.

6. An equipment for simulating high-speed magnetic levitation (maglev) operation, comprising:
a wheel;
a driving mechanism;
a first test guideway;
a second test guideway;
a first test object;
a second test object;
a first position control device; and
a second position control device;
wherein the wheel comprises a rim and a hub; the hub is arranged at a middle of the rim;
the driving mechanism is configured to drive the wheel to rotate;
the first test guideway and the second test guideway are arranged on an inner wall of the rim; the first test guideway is arranged on one side of the hub, and the second test guideway is arranged on the other side of the hub;
the first test object is arranged in the first test guideway;
the second test object is arranged in the second test guideway;
the first position control device is configured to control a reciprocating movement of the first test object along an axial direction of the first test guideway; and the second position control device is configured to control a reciprocating movement of the second test object along an axial direction of the second test guideway;
a vibration exciter is arranged above the first test object; a first six-axis force sensor is arranged between the vibration exciter and the first test object; the second test object is fixedly arranged on a first clamping arm; and a second six-axis force sensor is arranged between the second test object and the first clamping arm; and
the first test guideway is a circular Halbach permanent magnet guideway; the second test guideway is a circular metal guideway; the first test object is a high-temperature superconducting magnetic levitation test object; and the second test object is an electrodynamic levitation permanent magnet test object.

7. The equipment of claim 6, wherein the first position control device comprises a first bottom plate, a first sliding plate and a first motor; two first linear sliding tables parallel to each other are arranged on the first bottom plate; a first screw rod is arranged between the two first linear sliding tables; the first screw rod is connected to an output end of the first motor; a top of each of the two first linear sliding tables is provided with a first linear chute; a bottom of the first sliding plate is provided with two first sliding blocks respectively matched with two first linear chutes; the bottom of the first sliding plate between the two first sliding blocks is provided with a first thread insert; the first thread insert is threadedly connected with the first screw rod; a top of the first sliding plate is provided with a second clamping arm; the first test object is arranged on the second clamping arm; and the first screw rod and a central axis of the hub are parallel to each other; and the second position control device comprises a second bottom plate, a second sliding plate and a second motor; two second linear sliding tables parallel to each other are arranged on the second bottom plate; a second screw rod is arranged between the two second linear sliding tables; the second screw rod is connected to an output end of the second motor; a top of each of the two second linear sliding tables is provided with a second linear chute; a bottom of the second sliding plate is provided with two second sliding blocks respectively matched with two second linear chutes; the bottom of the second sliding plate between the two second sliding blocks is provided with a second thread insert; the second thread insert is threadedly connected with the second screw rod; a top of the second sliding plate is provided with the first clamping arm; the second test object is arranged on the first clamping arm; and the second screw rod and the central axis of the hub are parallel to each other.

* * * * *